J. M. SHAW.
Seed Planter.
No. 97,446.            Patented Nov. 30, 1869.
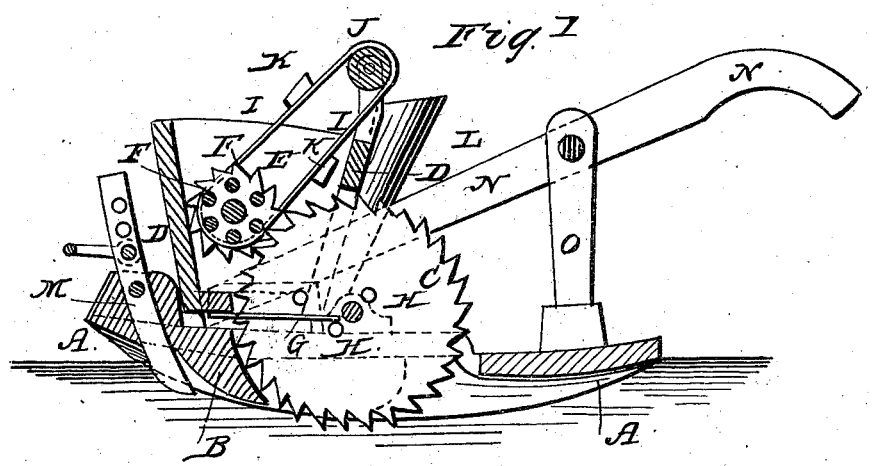
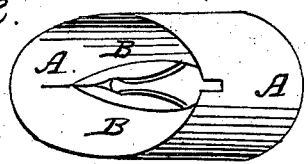
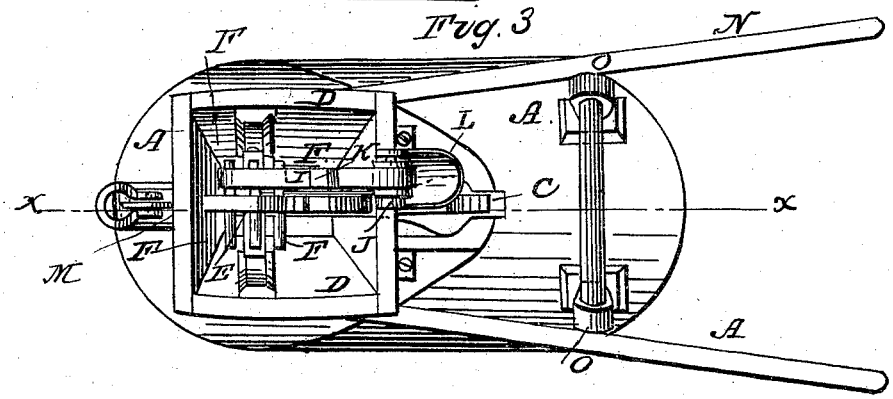
Witnesses
C. Wolff
alex. F. Roberts
Inventor
J. M. Shaw
by
Munn & Co.
attorneys

United States Patent Office.

JOHN M. SHAW, OF WATER VALLEY, MISSISSIPPI.

Letters Patent No. 97,446, dated November 30, 1869.

---

IMPROVEMENT IN SEED-PLANTERS.

---

The Schedule referred to in these Letters Patent and making part of the same.

---

*To all whom it may concern:*

Be it known that I, JOHN M. SHAW, of Water Valley, in the county of Yalabusha, and State of Mississippi, have invented a new and useful Improvement in Seed-Planters; and I do hereby declare that the following is a full, clear, and exact description thereof, which will enable others skilled in the art to make and use the same, reference being had to the accompanying drawings, forming part of this specification, in which—

Figure 1 is a vertical longitudinal section of my improved seed-planter, taken through the line *x x*, fig. 3.

Figure 2 is a detail under-side view of the bottom plate of the planter, the other parts being detached.

Figure 3 is a top view of the same.

Similar letters of reference indicate corresponding parts.

My invention has for its object to furnish an improved seed-planter, designed more particularly for planting cotton and corn, which will open the furrow, drop the seed, and cover it, leaving the top of the ridge rounded and smoothed off, and which may be easily adjusted for planting either kind of seed; and It consists in the construction and combination of the various parts of the machine, as hereinafter more fully described.

A is the bottom plate of the machine, which is made of iron, to obtain the necessary weight for pressing the soil down properly.

The under side of the plate A is hollowed out or concaved, as shown in figs. 1 and 2, the forward part being more deeply concaved, to allow the furrow to be pressed out to receive the seed, the sides of which furrow are pressed in by the rear part of the plate A, leaving the ridge or row rounded off and pressed down.

B is the opener, which is formed solidly upon or is rigidly attached to the under side of the forward part of the plate A.

The rear part of the opener B, and the part of the plate A directly above it, are slotted to receive the feed-wheel C, the journals of which revolve in bearings attached to the upper side of the plate A, as shown in the drawings.

The wheel C has teeth formed upon it, which serve a double purpose, first, to draw the cotton-seed out of the hopper, and, second, to take a firm hold upon the ground to prevent its slipping.

D is the hopper, which rests upon the upper side of the forward part of the plate A, between two flanges formed upon the said plate, to which the said hopper is pivoted by pins, screws, or bolts, passing through the rear parts of said flanges, and into or through the rear parts of the sides of the said hopper, so that the hopper may be rocked upon its seat to prevent the cotton-seed from sticking fast in the upper part of the said hopper.

E is a small toothed wheel, the journals of which revolve in bearings formed in or attached to the sides of the hopper, in such a position that the teeth of the wheel E may mesh into the teeth of the wheel C, to revolve the said wheel E by the advance of the machine.

F are pins, passed through and secured in holes in the wheel E, and projecting upon both sides of said wheel, to serve as stirrers to keep the cotton-seed properly stirred, and fed down to the lower part of the hopper.

The pins F are arranged in a circle, to adapt them to serve as a pulley, to receive the carrier-belt when the machine is to be used as a corn-planter.

To the bottom of the hopper D is attached a bar, G, projecting along the side of the wheel C, so as to be struck by the pin or pins H, attached to said wheel, to rock the said hopper, and thus shake down the cotton-seed.

When the machine is to be used as a corn-planter, the belt I is passed around the pins or stirrers F, and around the pulley J, pivoted to supports attached to the upper rear part of the hopper D.

To the belt I are attached cups K, of such a size as to contain enough seed for a hill, which cups take up the corn and discharge it into the conductor-spout L, attached to the rear side of the hopper D, and by which it is conducted into the furrow opened by the opener B.

M is the cutter, which passes down through a hole in the forward part of the plate A, to which it is adjustably secured by a pin or bolt, so that it may be raised or lowered, as required.

The forward edge of the lower end of the cutter M is rounded off, so that it may slide over roots and other obstructions that it cannot cut.

The draught-clevis may be attached to the upper part of the cutter M, or to the forward part of the plate A, as may be desired or convenient.

N are the handles, by means of which the machine is guided, and the forward ends of which are attached to flanges formed upon the upper side of the forward part of the plate A.

The rear parts of the handles N are connected with and supported by standards O, the lower ends of which are secured in sockets formed upon the rear part of the upper side of the plate A.

Having thus described my invention,

I claim as new, and desire to secure by Letters Patent—

1. The iron plate A, constructed and operating substantially as herein shown and described, and for the purpose set forth.

2. The combination of the slotted opener B with the concaved plate A, substantially as herein shown and described, and for the purpose set forth.

3. The combination of the hopper D with the plate A, substantially as herein shown and described, and for the purpose set forth.

4. The combination of the toothed wheel C, toothed wheel E, and stirrer-pins F, with the hopper D and plate A, substantially as herein shown and described, and for the purposes set forth.

5. Arranging the stirrer-pins F in a circle, to adapt them to serve as a pulley for the carrier-belt I, substantially as herein shown and described.

6. The combination of the bar G and pin or pins H with the hopper D and wheel E, substantially as herein shown and described, and for the purpose set forth.

7. The combination of the carrier-belt I K and conductor-spout L, with the hopper D, stirrer-pins F, wheels E and C, and plate A, substantially as herein shown and described, and for the purpose set forth.

8. The combination of the cutter M with the plate A, substantially as herein shown and described, and for the purpose set forth.

JOHN M. SHAW.

Witnesses:
J. O. HENDRICKS,
T. L. McFARLAND.